United States Patent [19]

Perumal, Jr. et al.

[11] Patent Number: 5,473,446
[45] Date of Patent: Dec. 5, 1995

[54] COLOR DIGITAL HALFTONING USING BLACK AND SECONDARY COLOR REPLACEMENT AND COLOR VECTOR DITHERING

[75] Inventors: Alexander Perumal, Jr., Poway; Paul H. Dillinger, Escondido, both of Calif.

[73] Assignee: Hewlett-Packard Company, Palo Alto, Calif.

[21] Appl. No.: 189,541

[22] Filed: Jan. 27, 1994

Related U.S. Application Data

[63] Continuation-in-part of Ser. No. 878,931, May 4, 1992, Pat. No. 5,377,024.

[51] Int. Cl.$^6$ .................................................. H04N 1/64
[52] U.S. Cl. ............................ 358/523; 358/502; 358/534
[58] Field of Search .................................... 358/500, 501, 358/502, 520, 521, 523, 524, 525, 530, 534, 536, 400, 401, 443, 448

[56] References Cited

U.S. PATENT DOCUMENTS

4,751,535   6/1988  Myers .
5,166,809  11/1992  Surbrook .................................. 358/456
5,301,269   4/1994  Alcorn et al. ........................... 395/158

Primary Examiner—Bentsu Ro
Attorney, Agent, or Firm—Dennis G. Stenstrom

[57] ABSTRACT

Provided is a system and method for selectively enabling a printer to deposit on a sheet cyan, magenta, yellow and black (C,M,Y and K) primary or black color dots at each of the plurality of pixel locations to produce a color image. The system comprises a memory for storing C, M, Y and K values for each pixel in the color image and a processor for controlling selective deposition of the C, M, Y and K colors. The system includes a memory for holding a color vector for each pixel, respectively in the color image; a memory for storing parameters of a dither cell; and a processor coupled to the memory for comparing the dither cell with each color vector, to select a color component to print at the corresponding pixel location based on the comparison. The system provides a halftoning technique that produces print quality near error diffusion quality with the speed of a dither by dithering on a color vector. The replacement of black and secondary colors by the system produces better print quality than other dither techniques.

20 Claims, 9 Drawing Sheets

000000000
COLOR DIGITAL HALFTONING USING BLACK AND SECONDARY COLOR REPLACEMENT AND COLOR VECTOR DITHERING

CROSS-REFERENCE TO RELATED APPLICATIONS

This is a continuation-in-part of commonly assigned U.S. patent application APPARATUS FOR FORMING COLOR IMAGES USING A HUE-PLUS-GRAY COLOR MODEL by PAUL H. DILLINGER, Ser. No. 07/878,931, filed May 4, 1992, now U.S. Pat. No. 5,377,024; and is related to the following copending and commonly assigned U.S. patent applications HALFTONE IMAGES USING PRINTED SYMBOLS MODELLING, by Qian Lin, Ser. No. 08/057,244, filed May 3, 1993; HALFTONE IMAGES USING SPECIAL FILTERS, by Qian Lin, Ser. No. 08/060,285, filed May 11, 1993; BI-LEVEL DIGITAL COLOR PRINTER SYSTEM EXHIBITING IMPROVED UNDERCOLOR REMOVAL AND ERROR DIFFUSION PROCEDURES by Gary Dispoto, et al., Ser. No. 08/187,567, filed Jan. 27, 1994; ADAPTIVE COLOR RENDERING BY AN INKJET PRINTER BASED ON OBJECT TYPE by Thomas G. Smith, et al., Ser. No. 08/189,006, filed Jan. 27, 1994; COLOR HALFTONING OPTIONS INFLUENCED BY PRINT MODE SETTING, by Kirt A. Winter, et al., Ser. No. 08/187,933, filed Jan. 27, 1994; MANUAL/AUTOMATIC USER OPTION FOR COLOR PRINTING OF DIFFERENT TYPES OF OBJECTS, by Sachin S. Naik, et al., Ser. No. 08/187,942, filed Jan. 27, 1994; and AUTOMATED OPTIMIZATION OF HARDCOPY OUTPUT by Steven O. Miller, et al., Ser. No. 08/188,618, filed Jan. 27, 1994; which are herein incorporated by reference.

FIELD OF THE INVENTION

This invention relates to digital color printers which produce binary level color dots to create a full-color representation of an image and, more particularly, to a digital color printer performing color digital halftoning on a color vector using noise dithering and replacement of black and secondary colors with primary colors.

BACKGROUND OF THE INVENTION

Currently, both ink jet printers and laser printers are capable of producing full color images with high quality and precision. Such color printers are controlled by a printer driver program which provides an interface between an application program running on a host processor and the printer. Normally, a user creates a document using an application on the host computer and then calls for initiation of the printer driver program. In response to the users instituting a print command, the host computer transmits a series of page descriptions to the printer driver. The printer driver then proceeds to use built-in functions to rasterize the page description into a pixel map of a predefined resolution (e.g. 300 dots per inch, 600 dots per inch, etc.). The printer driver must also adjust the printed colors to math the screen colors as closely as possible.

Personal computers (PC's) use eight bit values to designate each primary color. To produce secondary colors, a PC uses combinations of the three eight bit values to control the computer's display device (e.g. a color CRT). A 24 bit value can represent $2^{24}$ different color values, which color values can be reproduced by appropriate control of the CRT's color electron guns. When a color printer is called upon to accurately reproduce that many color values, extensive color processing is required.

Thus, in order to reproduce a received color value, a color printer must convert the color value into a color command that is recognized by the printer engine. It was early realized that it was impractical to produce a color table map that mapped all $2^{24}$ possible PC-generated input colors to printer engine color codes.

Each pixel in the pixel map comprises, for instance, three eight-bit values corresponding to red, green and blue values derived from or for a display device in the host processor. The printer driver must adjust the color values in accordance with a predetermined calibration function so as to assure that the to-be-printed colors will appear the same as, or bear some preselected relation to, the colors displayed on the display device.

This is performed by a color management or mapping system that assures the colors produced by one product (a printer, scanner, monitor, film recorder, etc.) match or relate as desired to those produced on others. Color management systems typically have two components, "profiles" of individual color products that specify the color capabilities of the device, and software that runs on a host computer that uses this information to insure that the colors produced by one product match those produced by another. In cases where a particular color is not within the color gamut of a target device (i.e. the target device simply is incapable of reproducing the color), the color management software must provide the closest possible match. Device independent color is a term describing a computer system capable of reproducing a color accurately on any attached color device (printer, monitor, scanner, etc.). Device-independent color is usually implemented by developing "device profiles" that describe the colors a product can produce and by developing a color matching engine that uses the profiles to convert color data to assure a match between devices.

RGB is a color space that uses as its primary colors red, green, and blue. These three colors are the primary "additive" colors. In devices that use projected light to produce an image (for example, televisions or computer monitors), the complete spectrum of colors can be reproduced using red, green, and blue. Red and green combine to form yellow, red and blue to form magenta, green and blue to form cyan, and all three to form white. Any other shade can be produced by combining different amounts of the three primary colors.

CMYK is a color space that uses as its primary colors cyan, magenta, yellow and black. These four colors are the primary "subtractive" colors, that is, when printed on paper, the CMYK colors subtract some colors while reflecting others. Cyan and magenta combine to form blue, cyan and yellow to form green, magenta and yellow to form red, and in theory, all three to form black. However, it is sometimes difficult to get a satisfying black using a given set of cyan, magenta, and yellow pigments, so many reflective color-based products add a "true" black color, hence CMYK, not CMY. (To avoid confusion with blue, the letter K is used to represent black). The CMYK color set is sometimes called "process color."

In printing the printer uses the three subtractive primary colors. They are called subtractive because in each, one of the three additive colors has been subtracted from the white light. When red is subtracted, green and blue are left which combine to form the color cyan. When green is subtracted, red and blue are left which combine to form the color magenta. When blue is subtracted, red and green light combine to form the color yellow. The printer's subtractive primary colors are cyan, magenta, and yellow. The overprinting of all three in solid images yields black. The combination is black because each has subtracted one of the three additive primary components of white light and the complete absence of light is black.

Thus, the printer driver must convert the red, green and blue values to Cyan (C), Magenta (M), and Yellow (Y) values. As a result, each pixel is then represented by three eight-bit values which identify the corresponding levels of C,M,Y that will be used to subsequently control the print mechanism. An additional eight-bit value is supplied for a pixel black (K) dot to be applied at the pixel location.

Color printers can print one of eight colors at a particular pixel (red, green, blue, cyan, magenta, yellow, black, or white). However, the computer can request any one of 16 million colors. Therefore, it is necessary to produce a translation between 24-bit pixels (16 million colors) and 3-bit pixels (eight colors). This translation is called digtal halftoning. It is an integral part of color printing.

Digital halftoning refers to any process that creates the illusion of continuous tone images by judicious arrangement of binary picture elements, such as ink drops in the case of inkjet printers. Thus, halftoning is printing the simulation of a continuous-tone image, such as a shaded drawing or a photograph, with groups or cells of color or black dots. The dots are placed in such a way that they appear to the human eye to be a single color. Digital halftoning is sometimes called spatial dithering.

Printing presses and most printers use halftoning to render images. On printing presses, different size dots can be used to produce different shades of gray or color. Most color printers are binary in nature, in that they either apply a full color dot or no color dot to a pixel location. Such color printers do not employ a control mechanism to enable adjustment of the intensity of a particularly applied color dot. In binary printers, different patterns of identical dots are used to produce halftone images. As a result, a printer driver for a binary color printer employs a color digital halftoning process which reduces the 24 bit color information to 3 bits per pixel print position (1 bit for each of the C,Y, and M color planes).

Dithering can be used to reproduce gray shades using only black ink, or the full spectrum of color using only the process colors (cyan, magenta, yellow, black). For example, to produce green, a color printer lays down patterns of small yellow and cyan dots that appear to the eye to be green. There are many halftoning techniques, each with its own method for laying down dots. Examples include pattern dithering and error diffusion.

Pattern dithering uses a library of set patterns to reproduce a color (in color printing) or a gray shade (in monochrome printing). Pattern dithering can be characterized as ordered or random. Ordered dithers generally fall into one of two broad classes, dispersed, or clustered.

In dithering, a lot of work had been done to create the ideal "dither cell". This effort has been put into developing dither cells that have random or "blue noise" characteristics. Such "super-smooth" dither cells produce an image that appears almost as good as error diffused, but with the speed performance of a dither. See U.S. patent applications HALFTONE IMAGES USING PRINTED SYMBOLS MODELLING, by Qian Lin, Ser. No. 08/057,244, filed May 3, 1993; and HALFTONE IMAGES USING SPECIAL FILTERS, by Qian Lin, Ser. No. 08/060,285, filed May 11, 1993.

Dithers are implemented by use of a dither cell or dither matrix or threshold array, also called a mask, a two dimensional matrix of thresholds. Pixel values are compared to corresponding entries in the dither cell to determine if they should be turned on or off. In this way a shade of red for example can be converted to full red or no red. Many different approaches exist that vary the size of the cell and the distribution of the thresholds. Thus, halftoning is accomplished by a simple pointwise comparison of the input image against a predetermined threshold array or mask. For every point or pixel in the input image, depending on which point value is larger, the image or the mask, either a 1 or 0, respectively, is placed at the corresponding location in the binary output image.

Pattern dithering in general benefits from ease of implementation. Pattern dithering is computationally fast but does not offer the best possible reproduction quality. Error diffusion is a technique for laying down dots of the three process colors to produce the full spectrum of color. Error diffusion techniques use complex algorithms to lay down dots of color in a random rather than a repeated pattern, which improves the quality of the image. Error diffusion makes the best approximation it can for a given pixel, calculates how far that approximation is from the ideal and propagates this "error" to neighboring pixels. In this way a given pixel may not be particularly accurate, but the area is. In general, error diffusion generates much better print quality than dithering. However, typically, intense calculation is required to create the random pattern, so printing images using error diffusion is much slower than using pattern dithering.

Thus, halftoning algorithms can generally be evaluated in terms of speed of execution and resulting print quality. Often a tradeoff needs to be made between an algorithm that is fast but does not produce optimum print quality versus an alternative approach with better print quality that takes longer. So the problem each halftoning technique is trying to address is how to quickly produce a high print quality image. There is a continuing need to improve the clarity of color images produced by binary color printers without decreasing speed.

Accordingly, it is an object of this invention to provide a binary color printer with a means for improving print image clarity.

It is yet another object of this invention to provide a binary color printer with means for automatically determining whether black or secondary colors should be replaced with a combination of C,M or Y dots.

It is yet another object of this invention to provide a binary printer with an improved noise dither process that is adaptive in accordance with a characteristic of a color to be printed.

SUMMARY OF THE INVENTION

A system selectively enables a printer to deposit on a sheet C,M, Y and K color dots at each of the plurality of pixel locations to produce a color image. The system comprises a memory for storing C,M, Y and K color values for each pixel in the color image and a processor for controlling selective deposition of the C,M, Y and K colors. The invention provides a system for selectively enabling a printer to deposit on a sheet, Cyan (C), Magenta (M), Yellow (Y) and Black (K) color dots at each of a plurality of pixel locations, to produce a color image, said system comprising: first memory means for storing a first array of color vectors for each pixel in the color image; second memory means for storing a dither cell; processor means coupled to said memory means for determining a second array of color print pixels from said first array of color vectors by comparing a said dither cell with the color vector values to determine whether to print cyan, magenta and yellow dots at each of said pixels location based on said comparison.

The present invention provides a halftoning technique that produces print quality near error diffusion with the speed of a dither by dithering on a color vector. Because of the replacement of black and secondary colors the present invention produces better print quality than any other dither technique including noise dithering and often the print quality is comparable to error diffusion. Moreover, the present invention has the speed advantage of a dither over error diffusion.

DETAILED DESCRIPTION OF THE PREFERRED EMBODIMENT

Figure 1:
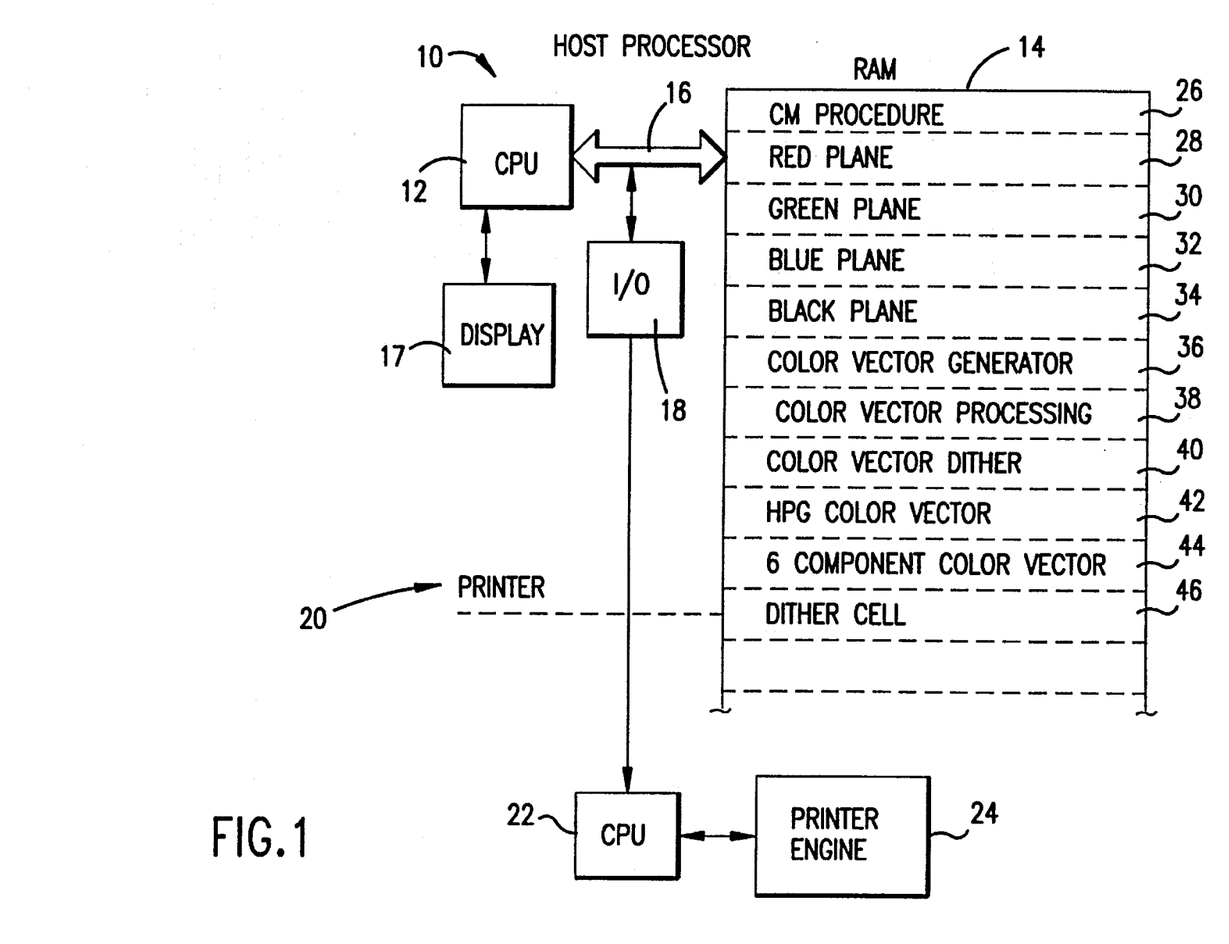
FIG. 1 is a high level block diagram showing a preferred embodiment of the present invention.

Referring to FIG. 1, a host processor 10 includes a central processing unit (CPU 12 which communicates with a random access memory (RAM) 14 via bus 16. A display 17 enables visualization of a color image from CPU 12. An input/output (I/O) module 18 enables data flow to a connected printer 20. Printer 20 includes a CPU 22 and a print engine 24, both of which act to provide binary dot pattern color images.

In RAM 14, a plurality of procedures and storage areas are included which enable the system of FIG. 1 to carry out the invention hereof. RAM 14 includes a CMM or color-matching module conversion procedure 26, and storage areas 28, 30, 32 and 34 which respectively store R, G, B and K pixel planes for a color image. RAM 14 further includes an RGB to color vector procedure 36 that enables the content of each pixel in the color image stored in image planes 28, 30, 32 and 34 to be represented as a color vector. A color vector processing procedure 38, and a halftoning procedure 40 are also stored in RAM 14. Also stored in RAM 14 are HPG color vectors 42, six-component color vectors 44, and dither cell 46.

Initially, CPU 12, in conjunction with CMM conversion procedure 26, converts each red (R), green (G), blue (B) pixel value from an image on display 17 to printer 24 RGB. During this conversion, an adjustment is made to take into account any color variations from standard colors that appear on display 17. A standard, 24-bit RGB triplet is passed in and converted into a different RGB triplet by the color matching module 26 conversion procedure. This color mapping procedure can be performed either automatically by the CM module or manually with user intervention. These procedures are described in U.S. patent applications ADAPTIVE COLOR RENDERING BY AN INKJET PRINTER BASED ON OBJECT TYPE by Thomas G. Smith, et al., Ser. No. 08/189,006, filed Jan. 27, 1994; COLOR HALFTONING OPTIONS INFLUENCED BY PRINT MODE SETTING, by Kirt A. Winter, et al., Ser. No. 08/187,933, filed Jan. 27, 1994; MANUAL/AUTOMATIC USER OPTION FOR COLOR PRINTING OF DIFFERENT TYPES OF OBJECTS, by Sachin S. Naik, et al., Ser. No. 08/187,941, filed Jan. 27, 1994; and AUTOMATED OPTIMIZATION OF HARDCOPY OUTPUT by Steven O. Miller, et al., Ser. No. 08/188,618, filed Jan. 27, 1994; which are herein incorporated by reference.

Figure 2:
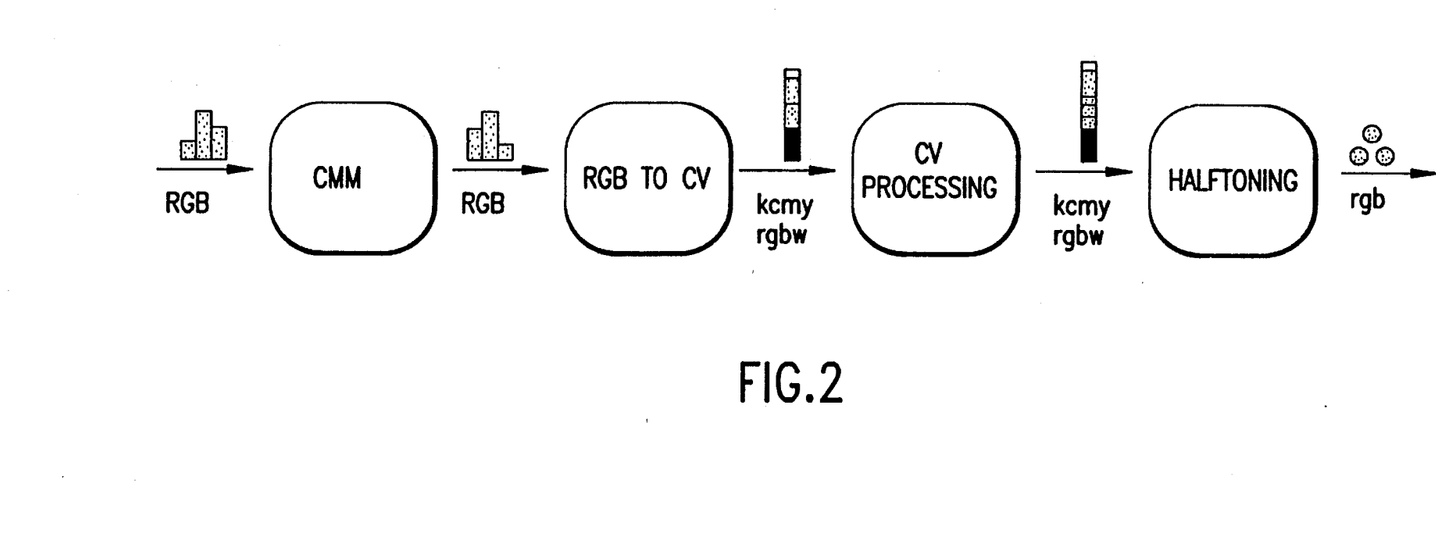
FIG. 2 is a high level flow diagram illustrating the color vector and halftoning operations of the present invention.

Once the CMM conversion procedure has been completed, the image is represented by separate R, G, and B image planes with each image plane including an 8 bit pixel value for each pixel location evidencing the intensity of the respective color for that pixel location. Thus, red plane 28 will have an 8 bit value indicative of the red intensity, green plane 30 will have an 8 bit value indicative of the green value, etc. An additional K plane, 34 includes an 8 bit K value for each pixel location. Before the respective RGB and K planes are passed to CPU 22 in printer 20, they are subjected to at least three procedures which enable an adjustment of the values of the respective colors to improve presentation in the image. Those procedures are RGB to color vector procedures 36, color vector processing procedures 38 and halftoning procedures 40. In FIG. 2, the above procedures are illustrated by a flow diagram.

Before describing the color vector conversion (CVC) procedure 36, the color vector processing (CVP) procedure 38 and the color vector dithering procedure 40, a description of the Hue-Plus-Gray (HPG) color model and color vector component thereof will be discussed, since this invention is best described in terms of the HPG color model. HPG incorporates the concept that renderings of a specific hue may be completely achieved by combining a quantity very closely related to the chroma of that hue with various levels of gray.

Color itself can be described according to three different characteristics. These do not take into account all the variables of color, but do handle the subject sufficiently to explain color printing. The "hue" of color is the actual color appearance, i.e. red, green, purple, orange, blue-green, etc. The hue is the characteristic which gives color a basic name. The second characteristic comes from the fact that some colors cannot be classified as hues, i.e. black, gray, and white. These are called achromatic colors. The presence of gray in a color is a measurement of the "chroma" and can be described as the color's intensity or saturation. The more gray, the less intense and vice versa. The third characteristic is defined as "value" in the Munsell color system and describes the color's lightness or darkness. Thus, you can have a light blue or a dark green, and both can be intense (lacking gray) in reference to their chroma.

Color space is a system for mathematically defining color. Many different color spaces exist, including RGB (red, green, blue), CMYK (cyan, magenta, yellow, black), and numerous device-independent color spaces such as Munsell, CIE XYZ and CIE L*a*b.

HPG is simultaneously a color space, a machine-space color vector, and a color-control concept that increases color control. It is a polar coordinate space and is designed to be consistent with the triangular shape of color palettes. In this model, color is divided into its two major components, chromatic and achromatic. Each of these components in turn is subdivided into two respective subcomponents. The chromatic component is divided into two fractional components consisting of two colorants called either primary and secondary, or dominant and subordinate primaries.

The chromatic component controls hue and chroma. Hue is controlled by combining only two colorants. The hue coordinates of the two colorants determine the range of hues that can be reproduced by those two colorants. Specifically, the range is restricted to only those hues positioned between the hues of the two colorants. As an example, hues that range from colorant 1 (here abbreviated "C1") through colorant 2 ("C2") may be achieved by applying quantities of C1 and C2 in which the fractional amounts of each range between zero and one, in inverse relationship, but summing to one.

Two favorable results are achieved by restricting the hues to those which are between the hues of the two colorants employed: (1) the possibility of reproducing a hue by using colorants which are further away from the desired hue is removed. At the rendition stage, this removes the possibility of hue artifacts. (2) the ability to control hues is increased, reducing hue errors.

Chroma is directly proportional to one coordinate of the HPG system, namely the quantity of colorant present. Chroma is controlled by controlling the quantity of colorant applied to the medium. Chroma is difficult to control when based only on the chroma of the primaries and secondaries (or colorants). For pixel-based color printing machines the colorant in each pixel overlaps slightly with the colorant from adjacent pixels. The resulting chroma is determined in part by the effective chroma for the hue that arises from mixing of the two colorants where they overlap. This effective chroma differs from the superposition or average of the two or several chromas nominally established by the apparatus for the primaries and secondaries in use. The chroma component of HPG can be correlated or controlled as a function of hue.

The achromatic component of color is described by a single variable, value $\underline{V}$ or lightness. Achromatic colors, called grays, are measured by using intermediate numbers along those scales between the high and low extremes white $\underline{W}$ and black $\underline{K}$. True grays have zero chroma and hue.

In the HPG system the control of value or lightness is achieved by controlling the quantity of gray to be applied. In turn, a specific gray is achieved by controlling the quantity of black used. Thus, the quantity of black is also a coordinate of the system.

The complete HPG model now will be described in terms of its individual components. The color space is described fractionally so that it can be easily scaled to the color primaries of any specific delivery system. The color space is divided into two components: the fractional part $F_c$ which is chromatic and the fractional part $F_a$ which is achromatic. In this document the chromatic fraction is also called "Fraction-Colorant" and denoted by the symbol $\underline{N}$. The sum of the chromatic and achromatic components produces unity:

$$F_c + F_a = \underline{N} + F_a = 1.$$

The chromatic portion $F_c = \underline{N}$ is the principal parameter for control of chroma. It is further subdivided into two components C1, C2 to control hue. The fractional parts $F_{c1}$ and $F_{c2}$ required for hue control are required to fill the chromatic space:

$$F_{c1} + F_{c2} = F_c = \underline{N}.$$

The achromatic or gray component $F_a$ is further divided into two components to control value. The fractional parts of black $\underline{K}$ and white $\underline{W}$ are required to fill the achromatic space:

$$F_k + F_w = F_a$$

In this document the variable $F_k$ is called "Fraction-Black" and is also denoted by the symbol $\underline{K}$.

The complete model of any color can be expressed as:

$$F_{c1} + F_{c2} + F_k + F_w = 1$$

This form is called an HPG color vector and is in a form suitable for halftoning either by ordered dither or error diffusion.

The HPG system permits direct control of the three major color attributes: value or lightness, hue, and chroma or vividness. Value or lightness is controlled by applying gray fractionally, e.g., by delivering black on a white medium. Hue is controlled as relative fractional proportions of two colorants and chroma is controlled by applying this hue fractionally.

More specifically, hues are created using fractional combinations of adjacent dominant and subordinate primary colorants C1, C2. These are selected to most closely enclose the target hue. The resulting color is shaded by inserting gray in place of some of the chromatic colorants, black to darken the color, white to lighten it. The total amount $\underline{N}$ of chromatic colorant is directly proportional to the conceptual chroma parameter $\underline{V}$ in idealized Munsell HVC space.

Because of good correlation or consistency with color-reproduction processes, the HPG system variables $\underline{H}$, $\underline{N}$, $\underline{K}$ or their elements $F_{c1}$, $F_{c2}$, $F_k$ can be applied with little variation in the process devices. Because the color is coded in terms which apply directly to the delivery mechanism, the HPG parameters can be halftoned directly.

Color Vector Conversion

Figure 3:
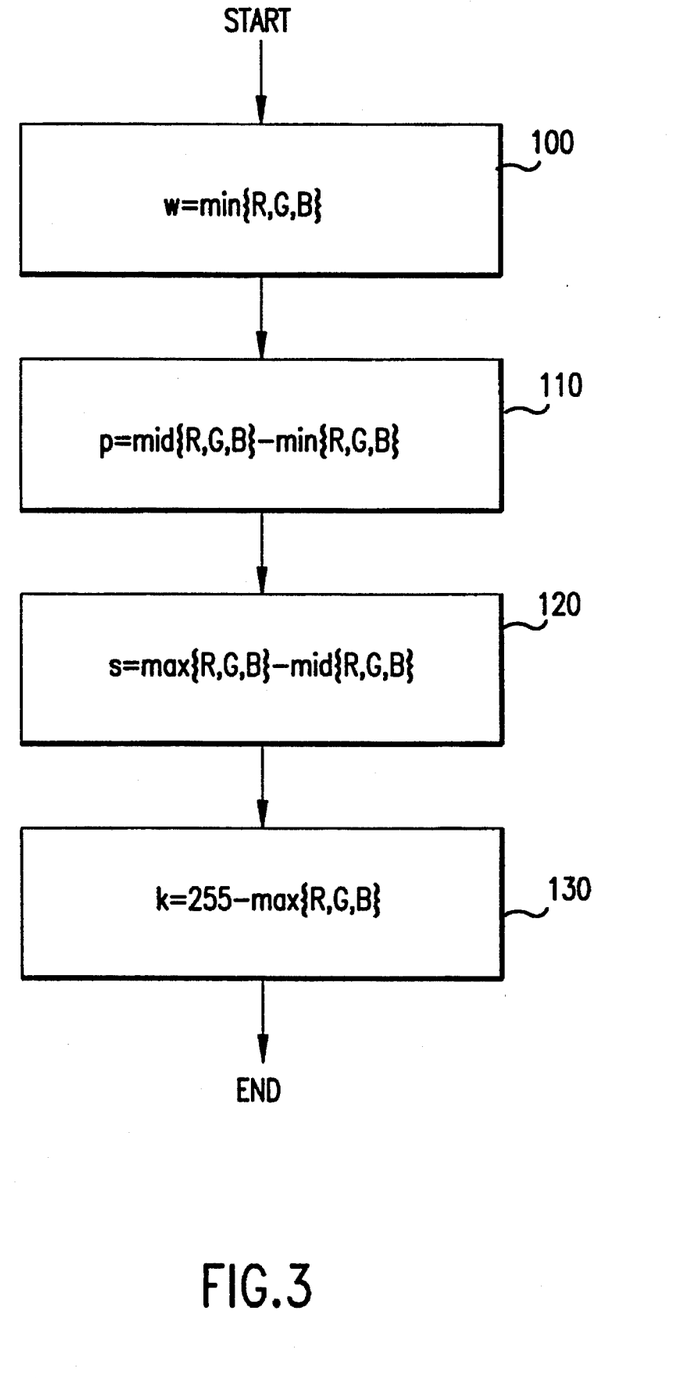
FIG. 3 is a flowchart showing the conversion of the RGB color planes to HPG color vector.

The RGB to color vector conversion procedure 36 in RAM 14 converts the RGB triplet into an HPG color vector. A color vector is the sum of n vector components each with a color (direction) and magnitude. As discussed above the HPG color vector is a 4 component color vector. Each component has a magnitude in the range 0–255 with the additional constraint that for a given pixel all the components of the color vector add up to 255. FIG. 3 is a flowchart showing the conversion of the RGB color planes to HPG color vector. In step 100, the white component of the color vector, w, is set a value equal to the value of the RGB component having the smallest value, i.e., w=min{R,G,B}. In step 110, the primary component (cyan, magenta or yellow) of the color vector, p, is set to a value equal to the difference in value between RGB component having the middle value and the RGB component having the minimum value, i.e., p=mid{R,G,B}−min{R,G,B}. In step 120, the secondary component (red, green or blue) of the color vector, s, is set to a value equal to the difference in value between the RGB component having the largest value and the RGB component having the middle value, i.e., s=max{R, G,B}−mid{R,G,B}. Finally, in step 130, the black component of the color vector, k, is set to a value equal to the difference in value between 255 and RGB component having the largest value, i.e., k=255−max{R,G,B}. The HPG color vector is a 4 component color vector that will have a black component, a white component, a primary color component (cyan, magenta or blue), and a secondary color component (red, green, or blue), any of which may have a zero value.

The HPG color model and color vectors are described in greater detail in copending commonly assigned U.S. patent application APPARATUS FOR FORMING COLOR IMAGES USING A HUE-PLUS-GRAY COLOR MODEL by PAUL H. DILLINGER, Ser. No. 07/878,931, filed May 4, 1992, and now issued as U.S. Pat. No. 5,377,024, which is herein incorporated by reference.

Color Vector Processing

The color vector is then processed by the color vector processing procedures 38 stored in RAM 14 into a different color vector. Typically, eight colors can be printed (R, G, B, C, M, Y, K, W). The CV Processing 38 translates the four component HPG color vector into a 6 component color vector from the 8 possible color components R, G, B, C, M, Y, K and W, with the restriction that the color vector will have a maximum of one secondary color component, (i.e., either a red, green, or blue secondary color component), or it may have no secondary component (i.e., a zero value for the secondary color component). The objective of the color vector processing is to minimize the contrast between dots on the page and adjacent areas which improve the printed image by providing a better simulation of continuous tone. A replacement scheme for black and secondary colors that accomplishes that objective is embodied in the present invention, wherein medium to light colors have primary (C,M,Y) dots and dark colors preserve secondary (R,G,B) and black dots.

In converting the four component HPG color vector into a 6 component color vector, the color vector processing procedures do the following: (1) black is replaced with certain levels of cyan, magenta, yellow, and black, and (2) secondary colors (i.e., red, green, blue) are replaced by certain levels of themselves (i.e., red, green, blue) and their primary components (i.e., cyan, magenta, yellow). In performing the above replacements, all or part of the white component of the color vector is replaced.

Figure 4:
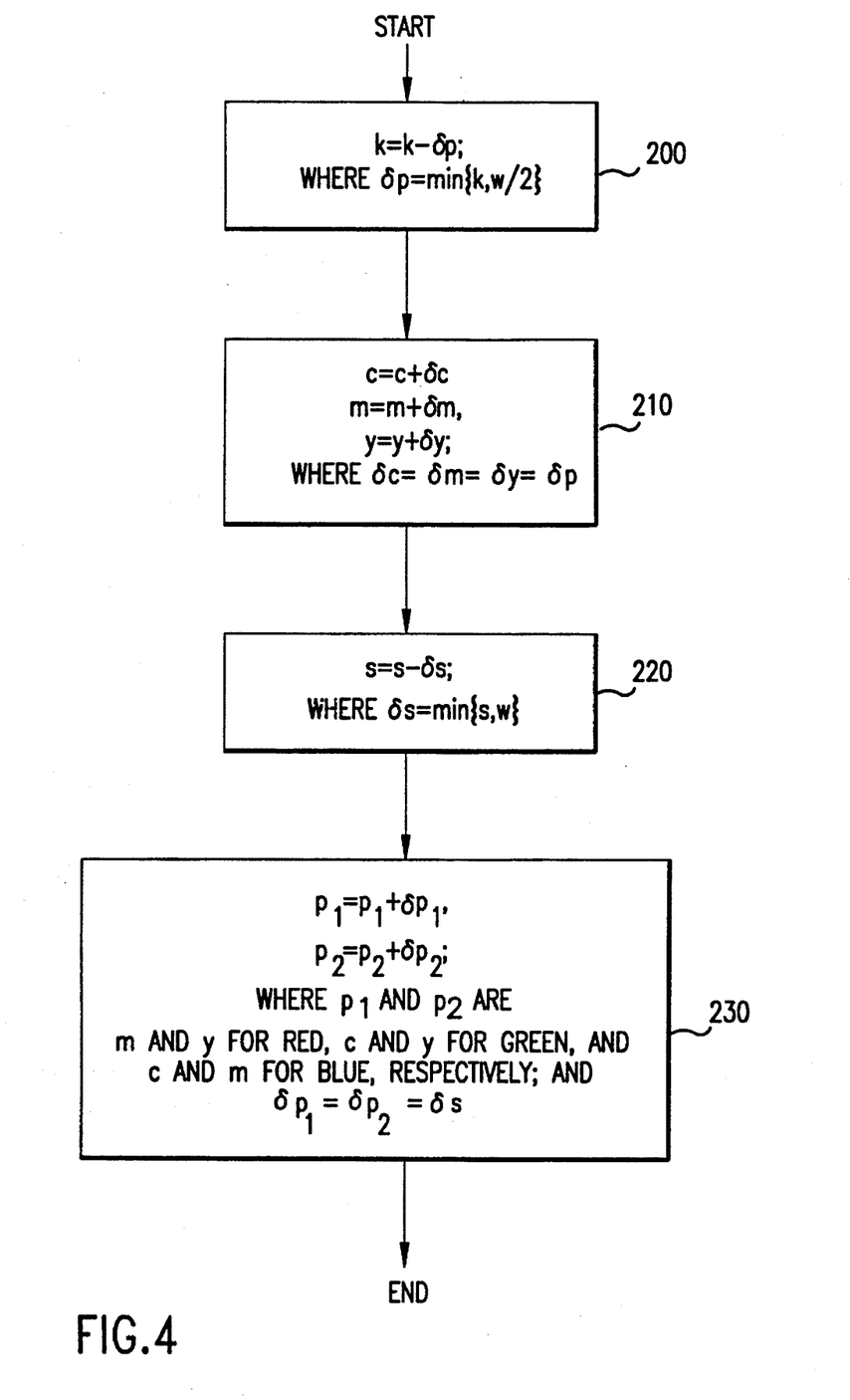
FIG. 4 is a flowchart showing the color vector processing procedures of the present invention.

For black, the color vector processing procedures attempt to replace a black dot with separate cyan, magenta, and yellow dots, Thus, if the black value in the color vector is "k" then the black component is made zero, i.e., make k=0, and add that value, $\delta p=k$, to the cyan, magenta, and yellow primary components. However, there is the restriction that the sum of the components of the color vector must total 255. To satisfy this restriction, the color vector processing procedures subtract $2*\delta p$ from the white component. Therefore, in order for the procedure to work, the white component must must be greater than or equal to twice the black component, i.e., so long as $w \geq 2*k$. The way to insure maximum replacement in all situations, is to make $\delta k=\min\{k,w/2\}$ instead of the value k. Referring to FIG. 4, in step 200 the black component k is reduced by $\delta k=\delta p=\min\{k,w/2\}$, i.e., $k=k-\delta k=k-\delta p$. In step 210, the primary components, p, are increased by the amount $\delta p=\delta k$, i.e., $c=c+\delta c$, $m=m+\delta m$, and $y=y+\delta y$; where $\delta c=\delta m=\delta y=\delta p$.

Thus, for dark colors, the white component, w, will be small and little replacement will occur. However, for light colors w will be large and full replacement of k will be allowed. These replacement procedures also cause a smooth transition in the middle colors.

After performing the replacement for the black component of the color vector, replacement for the secondary (R,G or B) component of the color vector is performed. Since the initial color vector is an HNK 4 component color vector it will have a maximum of one secondary colorcomponent, (i.e., either a red, green, or blue secondary color component), or it may have no secondary component (i.e., a zero value for the secondary color component). In the following discussion, the values for w, $p_1$, $p_2$ and s are the resulting values after black replacement. In step 220, the secondary color component, s, which can be either "r", "g", or "b", is reduced by $\delta s$, i.e., $s=s-\delta s$; where $\delta s=\min\{s,w\}$. In step 230, the primaries $p_1$, $p_2$ used to make up that secondary, s, which can be either "c", "m" or "y" are then increased by $\delta s$, i.e., $p_1=p_1+\delta p_1$; $p_2=p_2+\delta p_2$; where $p_1$ and $p_2$ are "m" and "y" for red, "c" and "y" for green, and "c" and "m" for blue, respectively, and $\delta p_1=\delta p_2=\delta s$. White is then reduced by $\delta s$, i.e., $w=w-\delta s$, to preserve the restriction that the sum of the components of the color vector must total 255. The secondary replacement is complete and the color vector processing is completed according to the replacement rules of the present invention.

The black component of the color vector is replaced first because the black dots are darker and therefore more offensive with respect to attempting to represent continuous tone in the lighter shades. Any value of the white component of the color vector that remains after black replacement is completed, is then available for secondary color replacement.

In an alternative embodiment of the present invention, the replacement rules are modified so that less replacement is performed when color blotching is likely. With a slight modification to the black replacement implementation, the replacement in the majority of mid-tones is restricted while preserving full replacement at low levels where it is most important. This is accomplished by instead of using the replacement value $\delta k=\min\{k, w/2\}$, $\delta k=\min\{k, w/\alpha\}$ is used. A similar change is made to the secondary color replacement. Instead of $\delta s=\min\{s, w\}$, $\delta s=\min\{s, w/\beta\}$. Values of $\alpha=16$ and $\beta=8$ have been found to work well.

These two simple changes cause a dramatic effect on the output. For large values of w, when using $\alpha=16$ $\beta=8$, $\delta k$ and $\delta s$ still exceed k and s, respectively, and full replacement is performed, but as the midtones are approached, using this alternative limitation causes more black and secondary dots to remain and any color blotching is minimized.

Figure 5:
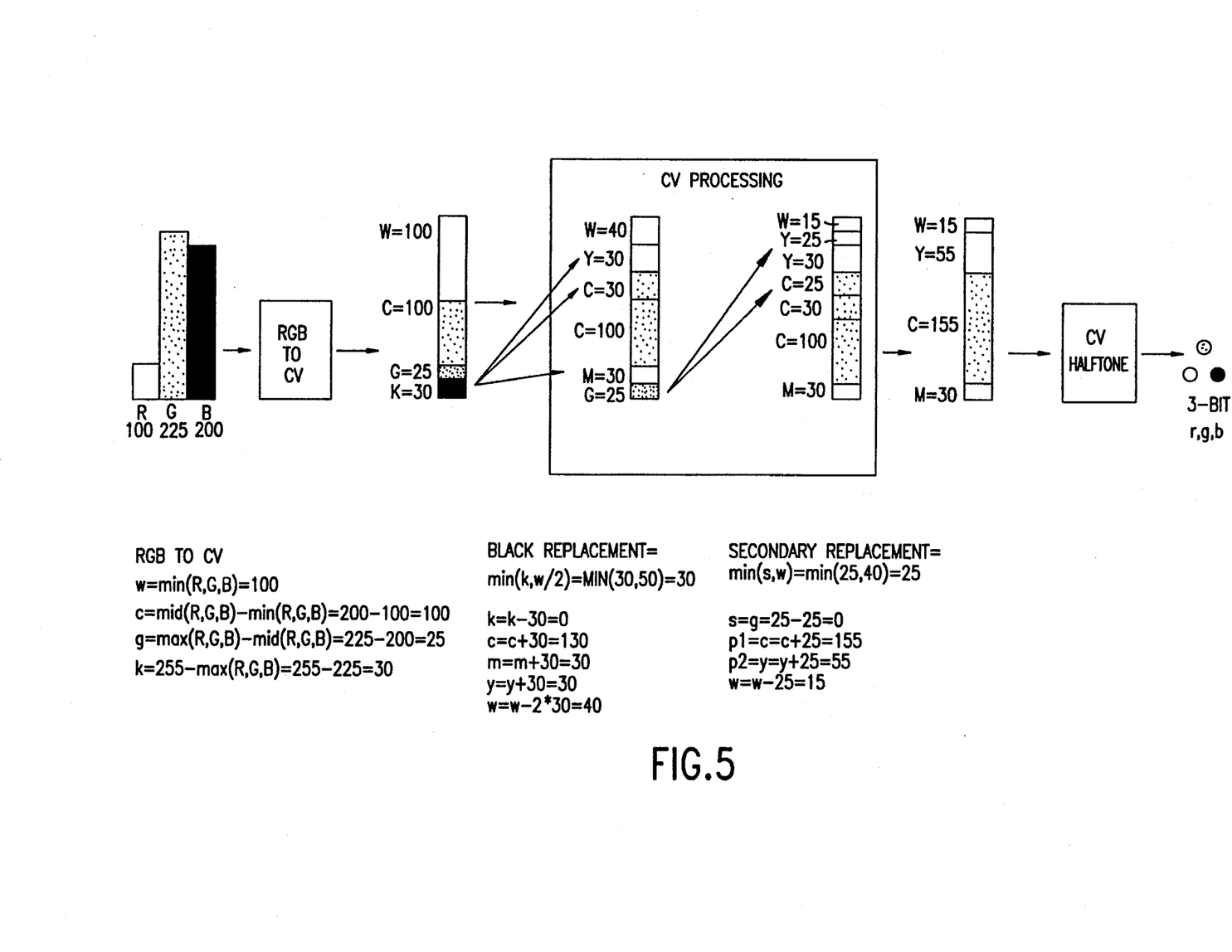
FIG. 5 is a schematic diagram illustrating the color vector processing procedures of FIG. 3 when there is enough white for full black and secondary color replacement.
Figure 6:
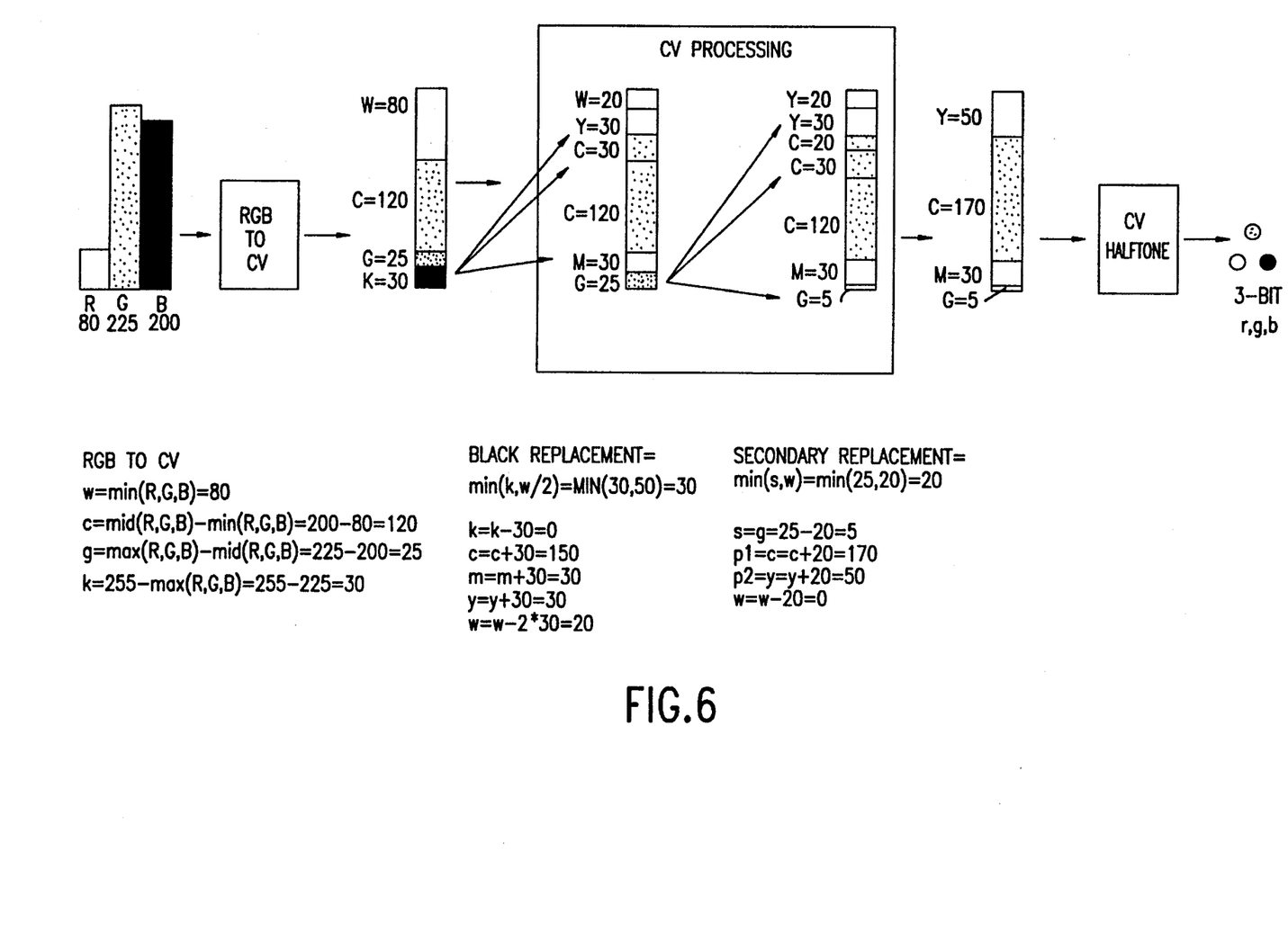
FIG. 6 is a schematic diagram illustrating the color vector processing procedures of FIG. 3 when there is enough white for full black, but only partial secondary color replacement.
Figure 7:
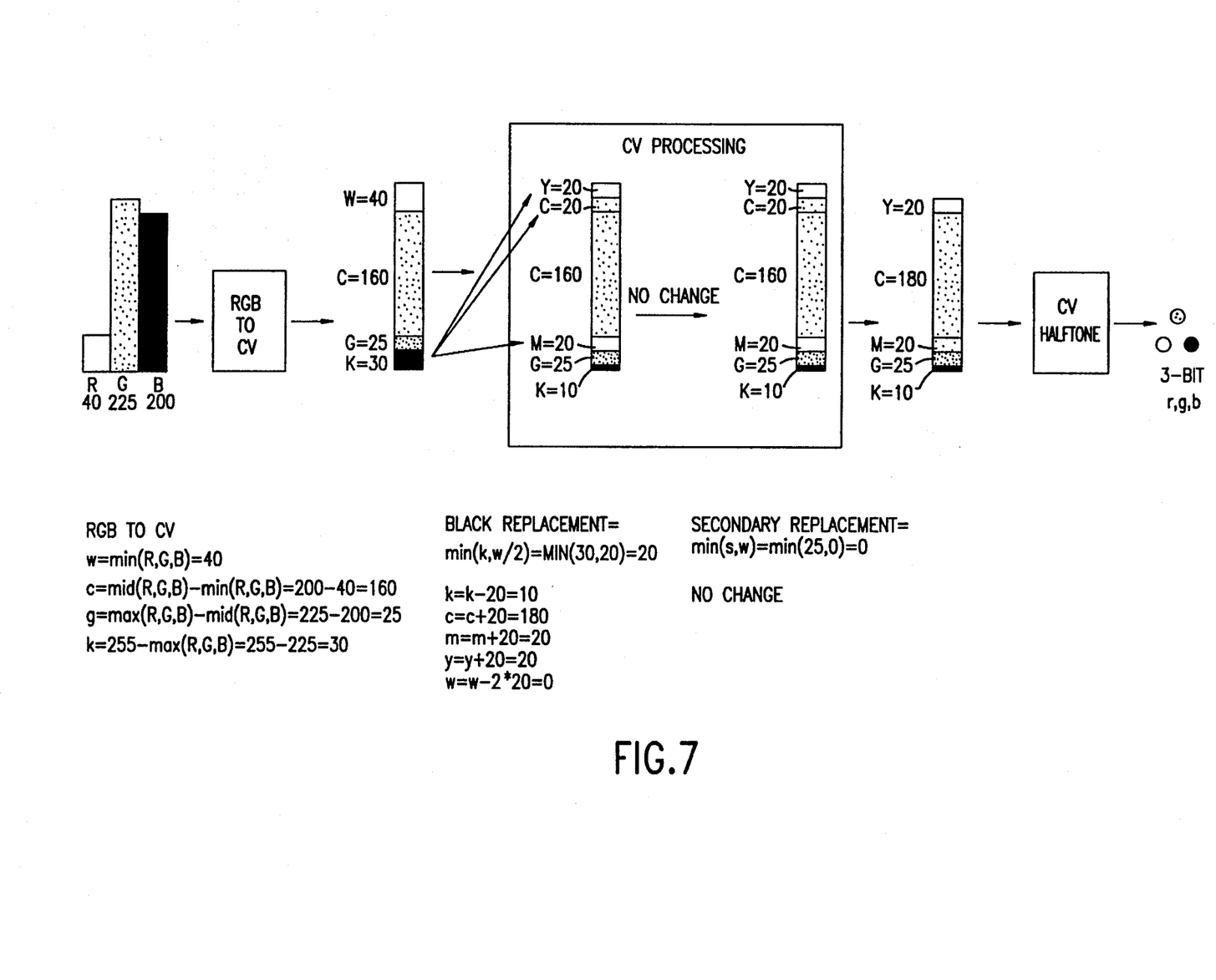
FIG. 7 is a schematic diagram illustrating the color vector processing procedures of FIG. 3 when there is enough white for for only partial black and no secondary color replacement.

FIG. 5 is a schematic diagram illustrating the color vector processing procedures when there is enough white for full black and secondary color replacement. FIG. 6 is a schematic diagram illustrating the color vector processing procedures when there is enough white for full black, but only partial secondary color replacement. FIG. 7 is a schematic diagram illustrating the color vector processing procedures when there is enough white for only partial black and no secondary color replacement. The details of these examples are evident from the Figures and no explanation is required.

Color Vector Dithering

Figure 8:
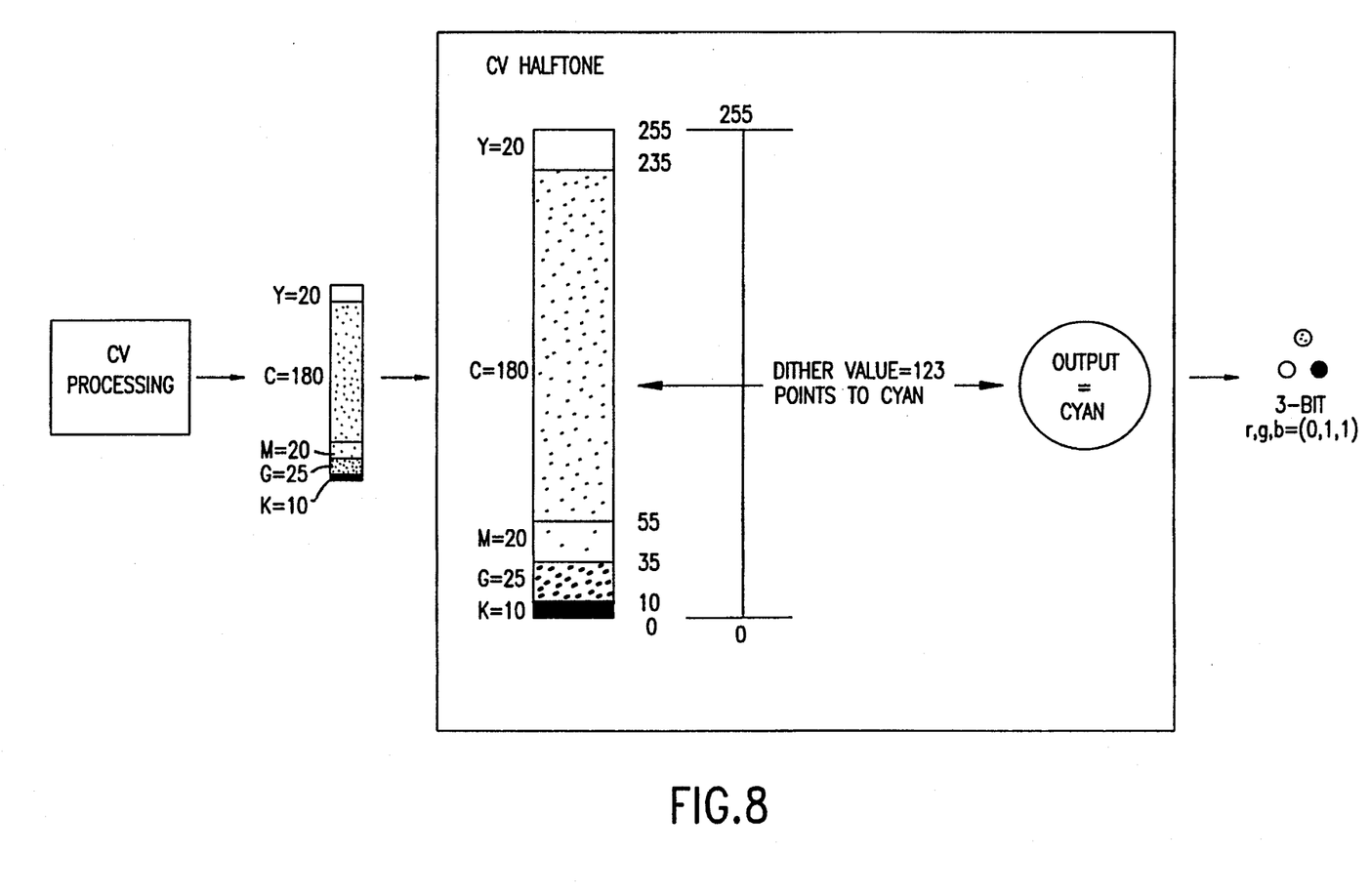
FIG. 8 is a schematic diagram showing the color vector dithering procedures of the present invention.
Figure 9:
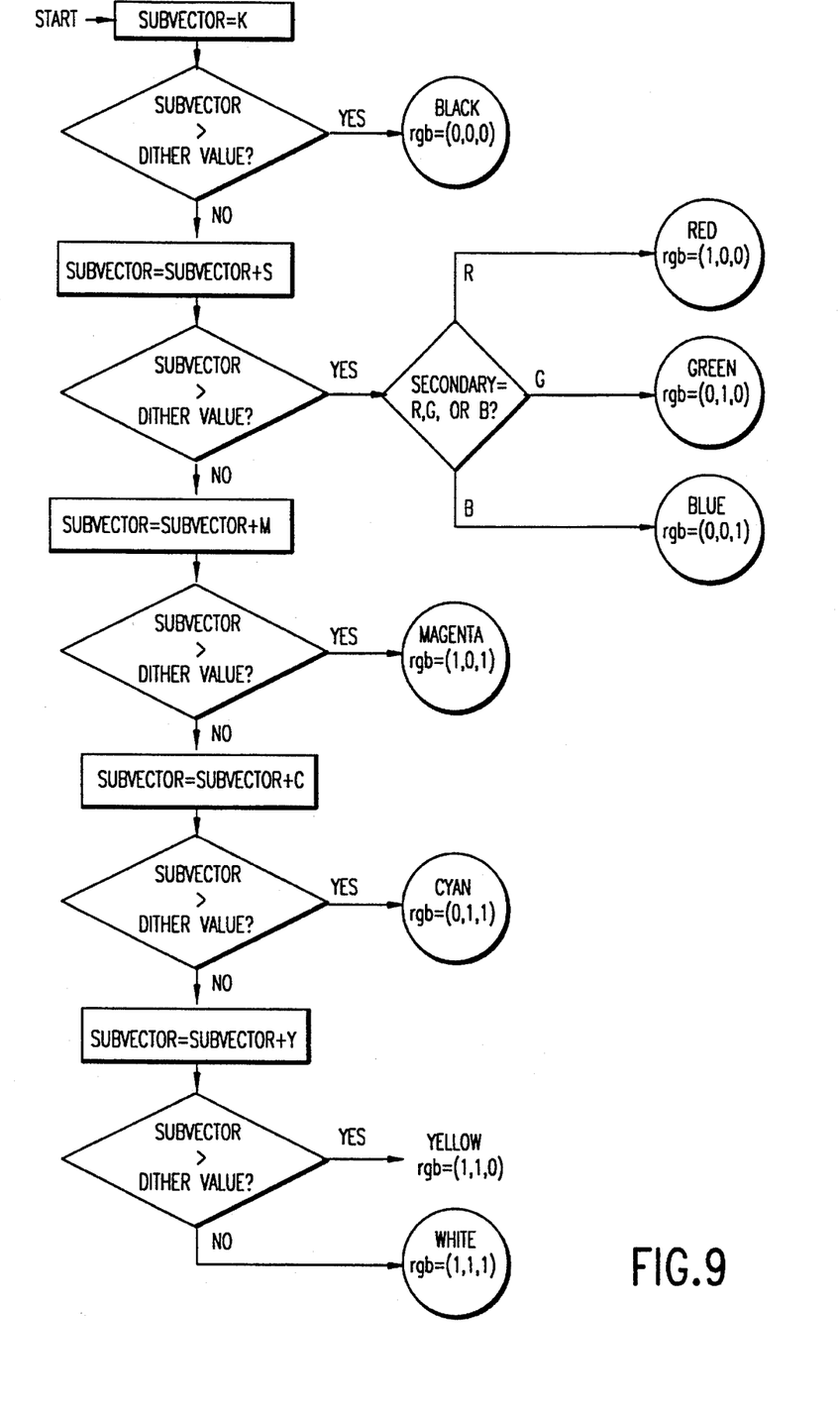
FIG. 9 is a flowchart showing an example of the color vector dithering procedures of the present invention.

Color printers typically can print one of eight colors at a particular pixel (red, green, blue, cyan, magenta, yellow, black, or white). However, the computer can request any one of 16 million colors. (Shades of 0–255 for Red, Green, and Blue produce 16 million combinations.) Therefore, it is necessary to produce a translation between 24-bit pixels (16 million colors) and 3-bit pixels (eight colors). As discussed above, this translation is called halftoning. An embodiment of the invention includes a method of halftoning, which comprises dithering on the 6 component color vector described previously. The following is a description of halftoning the HPG color vector using a noise cell. The dither cell is then used to select one of those six components. The component thus selected is the single color to be printed at that particular printer pixel. Dither cells are customarily placed initially in a position where the upper left corner of the cell corresponds to the upper left corner of the image being rendered. This placement causes each dither cell location to now correspond to specific pixels in the image area covered by the dither cell. The color printed by the halftoning process is determined by the comparison of the color vector of the pixel, and the value of the dither cell that corresponds to that pixel. Rendering of that area of the image corresponding to the area covered by the dither cells is performed. The dither cell is now re-positioned over the image by shifting the cell to the right by the amount which corresponds to the width of the cell. This new placement of the cell covers a new image area immediately adjacent to the area of the image previously covered. This part of the image may then be rendered. The dither cell is moved again and again until the right hand side of the image is reached. The process continues by returning the dither cell to the left side of the image and shifting it downward by the amount which corresponds to the height of the cell. The process is then repeated until the entire area of the image has been covered and rendered. Referring to FIG. 8, shown is the procedure for comparing the dither cell to the color vector. The decision steps, for each pixel are shown in the flowchart of FIG. 9 and need no further explanation.

It should be understood that the foregoing description is only illustrative of the invention. Various alternatives and modifications can be devised by those skilled in the art without departing from the invention. In addition, while the invention has been described with respect to a color ink jet printer, it is equally applicable to other color output apparatus which is required to perform a color transformation. Accordingly, the present invention is intended to embrace all such alternatives, modifications and variances which fall within the scope of the appended claims.

What is claimed is:

1. A system for selectively enabling a printer to deposit on a sheet primary or black color dots at each of a plurality of pixel locations, to produce a color image, said system comprising;

first memory means for holding a color vector for each pixel, respectively, in the color image;

second memory means for storing parameters of a dither cell;

processor means coupled to said memory means for comparing said dither cell with each color vector, to select a color component to print at the corresponding pixel location, based on said comparison.

2. The system of claim 1, wherein:

the first memory means and the processor means together comprise means for comparing the dither cell with nested subvectors, respectively made up of nested subcombinations of the color components in each color vector.

3. The system of claim 2, wherein:

the comparing means identify (1) the smallest subvector which is larger than a corresponding dither-cell value, and (2) a particular color component which is in that subvector but not in the next smaller subvector; and the processor means select that component to print.

4. The system of claim 3, wherein:

the subvector subcombinations are nested in a specified nesting sequence of the color components.

5. The system of claim 4, wherein:

the specified nesting sequence comprises black in the smallest nonzero subvector, and white in the largest.

6. The system of claim 5, wherein:

the specified nesting sequence comprises a secondary color in the next-to-said-smallest subvector.

7. The system of claim 6, wherein:

the specified nesting sequence comprises primary colors in the subvectors immediately larger than the next-to-said-smallest.

8. The system of claim 7, wherein:

the specified nesting sequence comprises the primary colors in order of increasing lightness.

9. The system of claim 7, wherein:

the primary colors are magenta, cyan and yellow; and the specified sequence comprises the primary colors in that order.

10. The system of claim 9, wherein:

the secondary colors are red, green and blue; and the printer prints the secondary colors as combinations of the primary colors.

11. The system of claim 1, wherein:

the second memory means comprise means defining a mask value for each pixel position in the dither cell;

the processor means comprise means for establishing which pixel position in the dither cell corresponds, for purposes of comparison, with each color vector;

the first memory means and the processor means comprise means for comparing the mask value in each pixel position in the dither cell with nested subvectors, respectively made up of components of the corresponding color vector.

12. The system of claim 11, wherein the establishing means comprise means for:

first, in effect positioning the dither cell in a corner of the plurality of pixel locations;

then in effect shifting the dither cell along a first direction until there are no more pixel locations in that direction;

then in effect shifting the dither cell along a second direction, substantially orthogonal to the first direction, and shifting the dither cell along the first direction until again there are no more pixel locations in that first direction; and then repeating the steps recited in the preceding paragraph until there are no more pixel locations along the second direction.

13. The system of claim 1, wherein:

the printer deposits drops of ink that are black and chromatic primaries;

the chromatic primaries are cyan, magenta and yellow; and the printer prints chromatic secondaries as combinations of the primaries.

14. The system of claim 1, further comprising:

means for receiving information about a desired color image and in response thereto generating said color vector;

wherein the receiving-and-generating means comprise means for:

expressing the desired color image information in the form of an input color vector for each pixel position, if the information is not already in that form; and replacing a fraction of the black in each input color vector with chromatic colors, to form the first-mentioned said color vector.

15. The system of claim 14, wherein the receiving-and-generating means further comprise:

means for removing a quantity of white in conjunction with said black replacement; and wherein the processor means comprise means for setting said fraction of the black component to a value between zero and one inclusive, depending upon the quantity of white that is available for removal.

16. The system of claim 15, wherein:

the receiving-and-generating means further comprise means for, in some color vectors, replacing at least part of a secondary color, if present, with primary colors.

17. The system of claim 16, wherein:

the receiving-and-generating means further comprise means for removing a further quantity of white to compensate for said secondary-color replacement; and said some color vectors are those in which said further quantity of white remains available after the black replacement.

18. The system of claim 1, further comprising:

means for translating said selected color at each pixel location into a form usable by said printer.

19. The system of claim 18, wherein:

said form usable by said printer comprises red, green and blue color coordinates.

20. A method of operating a color printer to print a desired image as an array of dots of colored ink at a large number of pixel positions, comprising the steps of:

receiving information about the desired color image for each pixel position;

expressing the desired color image information in the form of a color vector for each pixel position, if the information is not already in that form;

replacing at least part of the black in each color vector with chromatic colors;

removing a quantity of white to compensate for said black replacement;

replacing at least part of a secondary color, if present, in each color vector with primary colors, provided that at least a certain further quantity of white remains available after said black replacement;

removing said further quantity of white to compensate for said secondary-color replacement, if secondary-color replacement has been performed;

wherein said expressing, replacing and removing steps produce a resulting color vector;

comparing nested subvectors respectively made up of color components in the resulting color vector, at each pixel position, with a corresponding dither-cell value for that pixel position;

said nested subvectors being assembled in a sequence comprising black, then a secondary color, then the primary colors in order of increasing lightness, and then white;

selecting for printing, at the corresponding pixel location, the first component of the color vector which produces a cumulative aggregate greater than said corresponding dither-cell value;

translating said selected color vector at each pixel location into output color coordinates usable to control the printer; and applying the output color coordinates to control the printer.

* * * * *